(12) United States Patent
Shaath et al.

(10) Patent No.: US 7,076,624 B2
(45) Date of Patent: Jul. 11, 2006

(54) METHOD AND SYSTEM FOR PROVIDING RESTRICTED ACCESS TO A STORAGE MEDIUM

(75) Inventors: Kamel Shaath, Kanata (CA); Jonathan Gossage, Nepean (CA); Tony Walker, Stittsville (CA); Yasser Lulu, Ottawa (CA); Fu Yaqun, Nepean (CA)

(73) Assignee: KOM Networks Inc., Kanata (CA)

( * ) Notice: Subject to any disclaimer, the term of this patent is extended or adjusted under 35 U.S.C. 154(b) by 29 days.

(21) Appl. No.: 10/600,540

(22) Filed: Jun. 23, 2003

(65) Prior Publication Data

US 2004/0088296 A1    May 6, 2004

Related U.S. Application Data

(60) Continuation of application No. 10/032,467, filed on Jan. 2, 2002, now Pat. No. 6,654,864, which is a division of application No. 09/267,787, filed on Mar. 15, 1999, now Pat. No. 6,336,175.

(51) Int. Cl.
*G06F 12/14* (2006.01)

(52) U.S. Cl. .................................................. 711/163

(58) Field of Classification Search ................ 711/163; 707/9; 713/200
See application file for complete search history.

(56) References Cited

U.S. PATENT DOCUMENTS

| 4,757,533 | A | * | 7/1988 | Allen et al. ................. 713/192 |
| 4,890,223 | A | * | 12/1989 | Cruess et al. ................ 711/207 |
| 4,947,318 | A | * | 8/1990 | Mineo .......................... 713/200 |
| 4,958,314 | A | * | 9/1990 | Imai et al. ................ 369/47.54 |
| 4,975,898 | A | * | 12/1990 | Yoshida ....................... 369/100 |
| 5,163,147 | A | * | 11/1992 | Orita ............................. 707/9 |
| 5,214,627 | A | * | 5/1993 | Nakashima et al. ...... 369/275.3 |
| 5,434,562 | A | * | 7/1995 | Reardon ...................... 713/200 |
| 5,495,533 | A | * | 2/1996 | Linehan et al. ............. 713/155 |
| 5,537,636 | A | * | 7/1996 | Uchida et al. .............. 707/200 |
| 5,572,675 | A | * | 11/1996 | Bergler ........................ 719/328 |
| 5,596,755 | A | * | 1/1997 | Pletcher et al. ............. 710/261 |
| 5,708,650 | A | * | 1/1998 | Nakashima et al. ...... 369/275.3 |
| 5,717,683 | A | * | 2/1998 | Yoshimoto et al. ....... 369/275.3 |
| 5,778,365 | A | * | 7/1998 | Nishiyama ..................... 707/9 |
| 5,825,728 | A | * | 10/1998 | Yoshimoto et al. ....... 369/30.11 |
| 5,850,566 | A | * | 12/1998 | Solan et al. .................... 710/5 |
| 5,949,601 | A | * | 9/1999 | Braithwaite et al. .......... 360/60 |
| 5,978,914 | A | * | 11/1999 | Carley et al. ............... 713/200 |
| 6,044,373 | A | * | 3/2000 | Gladney et al. .............. 707/10 |
| 6,286,087 | B1 | * | 9/2001 | Ito et al. ..................... 711/164 |
| 6,336,187 | B1 | * | 1/2002 | Kern et al. .................. 713/161 |

* cited by examiner

*Primary Examiner*—Hiep T. Nguyen
(74) *Attorney, Agent, or Firm*—Venable LLP; Ralph P. Albrecht; Caroline J. Swindell

(57) ABSTRACT

A method of restricting file access is disclosed wherein a set of file write access commands are determined from data stored within a storage medium. The set of file write access commands are for the entire storage medium. Any matching file write access command provided to the file system for that storage medium results in, an error message. Other file write access commands are, however, passed onto a device driver for the storage medium and are implemented. In this way commands such as file delete and file overwrite can be disabled for an entire storage medium.

31 Claims, 7 Drawing Sheets

METHOD AND SYSTEM FOR PROVIDING RESTRICTED ACCESS TO A STORAGE MEDIUM

This is a continuation application of U.S. Application No. 10/032,467 filed Jan. 2, 2002 now U.S. Pat. No. 6,654,864, which is a Divisional Application of U.S. Application No. 09/267,787 filed Mar. 15, 1999, now U.S. Pat. No. 6,336,175.

FIELD OF THE INVENTION

The present invention relates to data storage and more particularly to a method of providing restricted write access on a data storage medium.

BACKGROUND OF THE INVENTION

In the past, operating systems restricted file access based on three criteria. The first criterion relates to the physical limitations of the storage device. For example, a CD-ROM drive only provides read access and therefore is restricted to read-only operation. The second relates to limitations of the storage medium. For example, a CD is a read-only medium, a CDR is a read/write medium but when a CD is full, the writer becomes a read-only medium, and so forth. The third relates to file access privileges. For example, in the UNIX operating system a file is stored with a set of access privileges including read and write privileges. Some files are read only and others are read/write and so forth.

Unfortunately, these access privileges fail to adequately provide protection for archival storage devices such as magnetic tape or removable optical media.

An example of a popular operating system is Windows NT®. Using Windows NT®, device drivers are hidden from applications by a protected subsystem implementing a programming and user interface. Devices are visible to user-mode programs, which include protected subsystems, only as named file objects controlled by the operating system input/output (IO) manager. This architecture limits an amount of knowledge necessary to implement device drivers and applications. In order to provide reasonable performance, the two separated systems, device drivers and applications, operate independently.

For example, when a write operation is requested by an application, the request is made via a file object handle. The application does not actually communicate with the storage device nor does the device driver for that storage device communicate with the application. Each communicates with the operating system independently. Thus, when the write command is issued for writing data to a device, the data is stored in buffer memory while the destination device is being accessed. A successful completion status is provided to the application. When the destination storage device is available, the stored data is written to the destination storage device. When the storage device is unavailable or fails to support write operations, the data is not successfully written. An error message may result, but will not be directed toward the application since it is not known to the device driver or is inaccessible. For example, the application may have terminated before the error occurs. Alternatively, no error message results and when the buffer is flushed or when the system is rebooted, the data is lost. Neither of these results is acceptable in normal computer use.

Fortunately, most devices are easily verified as to their capabilities. Read only devices are known as are read/write devices. Because a CD-ROM drive never becomes a read/write device, it is easily managed. When a device supports both read/write media and read only media the problem becomes evident.

In order better to highlight the problem, an example is presented. When a hard disk is full, accessing a file results in updating of file information relating to a last access date and so forth, journaling. File access information is updated each time a file is retrieved. The information requires no extra memory within the hard disk and therefore, the status of the hard disk, full or available disk space, is unimportant since the new file access information overwrites previous file access information. Thus, the file system writes to storage media even when full, so long as the capability of doing so exists.

When an archive data store is used with a data store device, it is often desirable that it not be written to. Therefore, accessing a file requires that the file access information is not updated—journaling is not performed. Unfortunately, when the data store device is accessed via a read/write file object handle, updating of the file access information is performed by the file system. As such, the data store is altered even when this is not desired. Further, since a single data store device accepts any number of different data stores during a period of time when the file system is in continuous operation, it is impractical if not impossible to remount the data store device with a new data store device driver and a new file object handle whenever the read/write privileges change. Currently, there is no adequate solution to overcome this problem.

In an attempt to overcome these and other limitations of the prior art, it is an object of the present invention to provide a method of limiting access privileges for a storage medium that supports increased flexibility over those of the prior art.

SUMMARY OF THE INVENTION

In accordance with the invention there is provided a method of providing restricted access to a storage medium in communication with a computer comprising the step of:
  executing a file system layer on the computer, the file system layer supporting a plurality of file system commands;
  executing a trap layer on the computer, the trap layer logically disposed above the file system layer;
  providing to the trap layer at least a disabled file system command relating to the storage medium and supported by the file system for the storage medium;
  intercepting data provided to the file system layer including an intercepted file system command;
  comparing the intercepted file system command to each of the at least a disabled file system command to produce at least a comparison result; and,
  when each of the at least a comparison result is indicative of other than a match, providing the intercepted file system command to the file system layer.

In some embodiments an application layer is in execution logically above the trap layer such that the trap layer is logically disposed between the application layer and the file system layer; and when a comparison result from the at least a comparison result is indicative of a match, providing an error indication to the application layer. Preferably, the error indication is provided from the trap layer.

In accordance with the invention there is further provided a method of restricting access to a storage medium in communication with a computer, the method comprising the step of:

executing a file system layer on the computer, the file system layer supporting a plurality of file system commands;

providing to the file system layer at least a disabled file system command for the storage medium, the disabled file system command supported by the file system for the storage medium, the at least a disabled file system command being other than all write commands, other than all read commands, and other than all write commands and all read commands;

comparing file system commands provided to the file system layer to each of the at least a disabled file system command to produce at least a comparison result; and, when each of the at least a comparison result is indicative of other than a match, executing the file system command.

In an embodiment the method also comprises the following steps: providing an indication of a data write access privilege for the entire logical storage medium, the data write access privilege indicative of a restriction to alteration of a same portion of each file stored on the logical storage medium; and restricting file access to the logical storage medium in accordance with the indication while allowing access to free space portions of the same logical storage medium.

In accordance with the invention there is also provided a method of restricting access by a computer to a storage medium other than a write once medium in communication with the computer, the method comprising the steps of: providing an indication of a data write access privilege for the entire logical storage medium indicating a disabled operation relating to alteration of a portion of each file stored within the logical storage medium, the indication other than a read only indication; and, restricting file access to each file within the logical storage medium in accordance with the same indication while allowing access to free space portions of the same logical storage medium. In an embodiment the indication comprises at least one of the following: write access without delete, write access without rename; write access without overwrite, and write access without changing file access privileges.

In accordance with the invention there is also provided a method of restricting access by a computer to a storage medium other than a write once medium in communication with the computer, the method comprising the steps of: providing an indication of a data write access privilege for the entire logical storage medium indicating a disabled operation relating to alteration of data within the logical storage medium, the indication other than a read only indication, the disabled operations supported by the storage medium; and restricting write access to data within the logical storage medium in accordance with the same indication while allowing access to free space portions of the same logical storage medium. A logical storage medium consists of a single physical storage medium or a single partition within a storage medium. Typically a disabled operation relates to destruction of data stored within a storage medium. Operations of this type include delete file, overwrite file, and rename file.

The present invention is preferably applied to removable storage media and more preferably to optical storage media such as removable optical rewritable disks.

According to an aspect of the present invention, restricted write access privileges for data stored within a data storage medium are supported. Advantageously, access privileges of this type allow write access to storage media or data files but limit that access in certain respects. These restrictions permit some level of control over a storage medium while providing some write privileges.

BRIEF DESCRIPTION OF THE DRAWINGS

Exemplary embodiments of the invention will now be described in conjunction with the drawings in which.

DETAILED DESCRIPTION OF THE INVENTION

Figure 1:
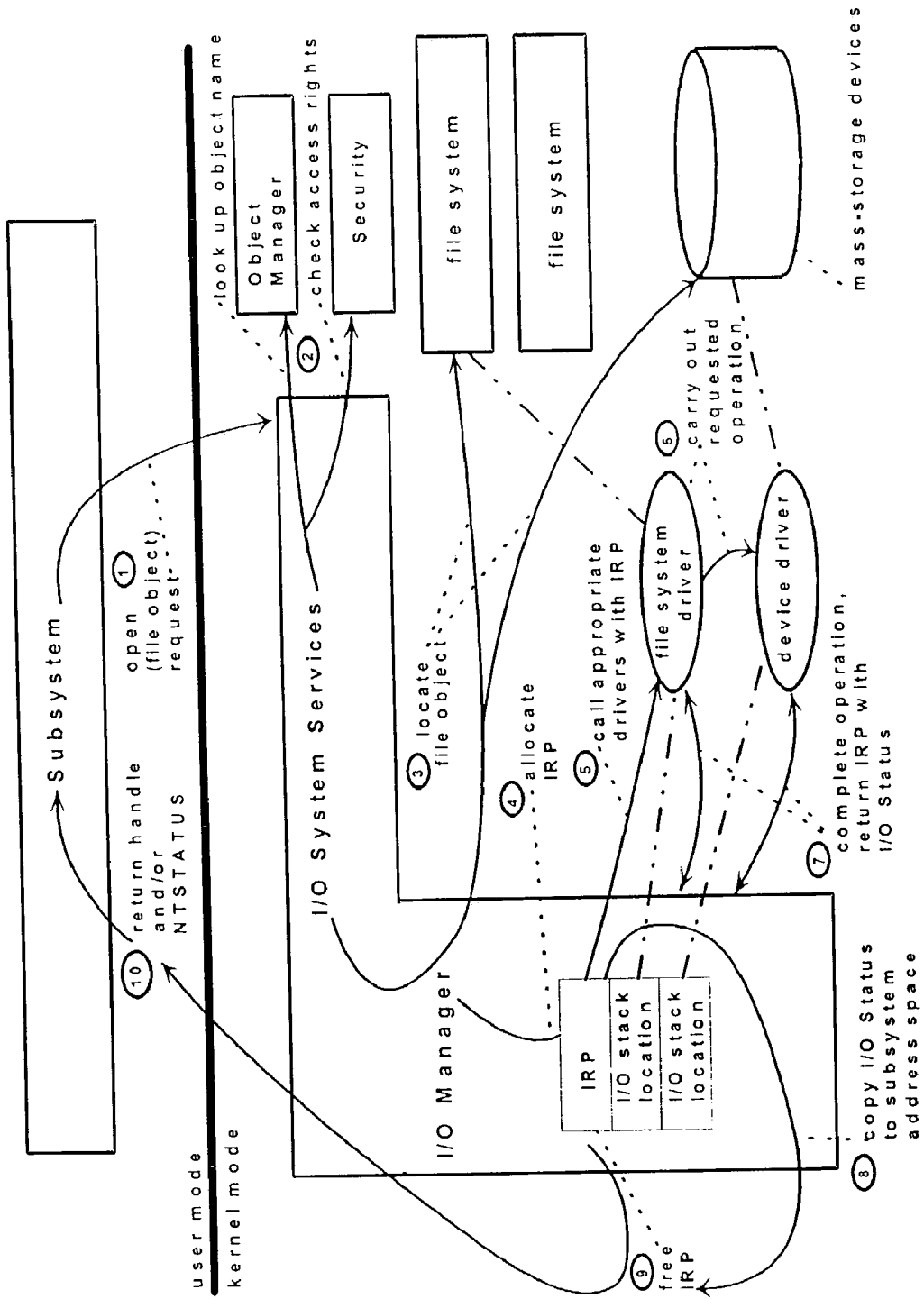
FIG. 1 is a simplified block diagram of an NT® operating system architecture during a process of opening a file is shown.

Referring to FIG. 1, a simplified block diagram of a Windows NT® (NT) operating system architecture during a process of opening a file is shown. NT drivers are hidden from end users by an NT protected subsystem that implements an already familiar NT programming interface. Devices are visible only as named file objects controlled by the NT Input/Output (IO) Manager to user-mode programs including protected subsystems,.

An NT protected subsystem, such as the Win32® subsystem, passes IO requests to the appropriate kernel-mode driver through the IO system services. A protected subsystem insulates its end users and applications from having to know anything about kernel-mode components, including NT drivers. In turn, the NT IO Manager insulates protected subsystems from having to know anything about machine specific device configurations or about NT driver implementations.

The NT IO Manager's layered approach also insulates most NT drivers from having to know anything about the following: whether an IO request originated in any particular protected subsystem, such as Win32 or POSIX; whether a given protected subsystem has particular kinds of-user-mode drivers; and, the form of any protected subsystem's IO model and interface to drivers.

The IO Manager supplies NT drivers with a single IO model, a set of kernel-mode support routines. These drivers carry out IO operations, and a consistent interface between the originator of an IO request and the NT drivers that respond to it results. File system requests are a form of IO request.

A subsystem and its native applications access an NT driver's device or a file on a mass-storage device through file object handles supplied by the NT IO Manager. A subsystem's request to open such a file object and to obtain a handle for IO to a device or a data file is made by calling the NT IO system services to open a named file, which has, for example, a subsystem-specific alias (symbolic link) to the kernel-mode name for the file object.

The NT IO Manager, which exports these system services, is then responsible for locating or creating the file object that represents the device or data file and for locating the appropriate NT driver(s).

The system follows a process described below in accordance with FIG. 1 for performing a file open operation. The subsystem calls an NT IO system service to open a named file. The NT IO Manager calls the Object Manager to look up the named file and to help it resolve any symbolic links for the file object. It also calls the Security Reference Monitor to check that the subsystem has the correct access rights to open that file object.

If the volume is not yet mounted, the IO Manager suspends the open request, calling one or more NT file systems until one of them recognises the file object as some thing it has stored on one of the mass storage devices the file system uses. When the file system has mounted the volume, the IO Manager resumes the request.

The IO Manager allocates memory (a RAM Cache) for and initialises an IRP (IO request packet) for the open request. To NT drivers, an open is equivalent to a "create" request. The IO Manager calls the file system driver, passing it the IRP. The file system driver accesses its IO stack location in the IRP to determine what operation to carry out, checks parameters, determines if the requested file is in cache memory, and, if not sets up the next lower driver's IO stack location in the IRP.

Both drivers process the IRP and complete the requested IO operation, calling kernel-mode support routines supplied by the IO Manager and by other NT components. The drivers return the IRP to the IO Manager with the IO status block set in the IRP to indicate whether the requested operation succeeded and/or why it failed. The IO Manager gets the IO status from the IRP, so it can return status information through the protected subsystem to the original caller. The IO Manager frees the completed IRP.

The IO Manager returns a handle for the file object to the subsystem if the open operation was successful. If there was an error, it returns appropriate status information to the subsystem.

After a subsystem successfully opens a file object that represents a data file, a device, or a volume, the subsystem uses the returned file object handle to request that device for IO operations typically in the form of read, write, or device IO control requests. These operations are carried out by calling the IO System services. The IO Manager routes these requests as IRPs sent to appropriate NT drivers.

Figure 2:
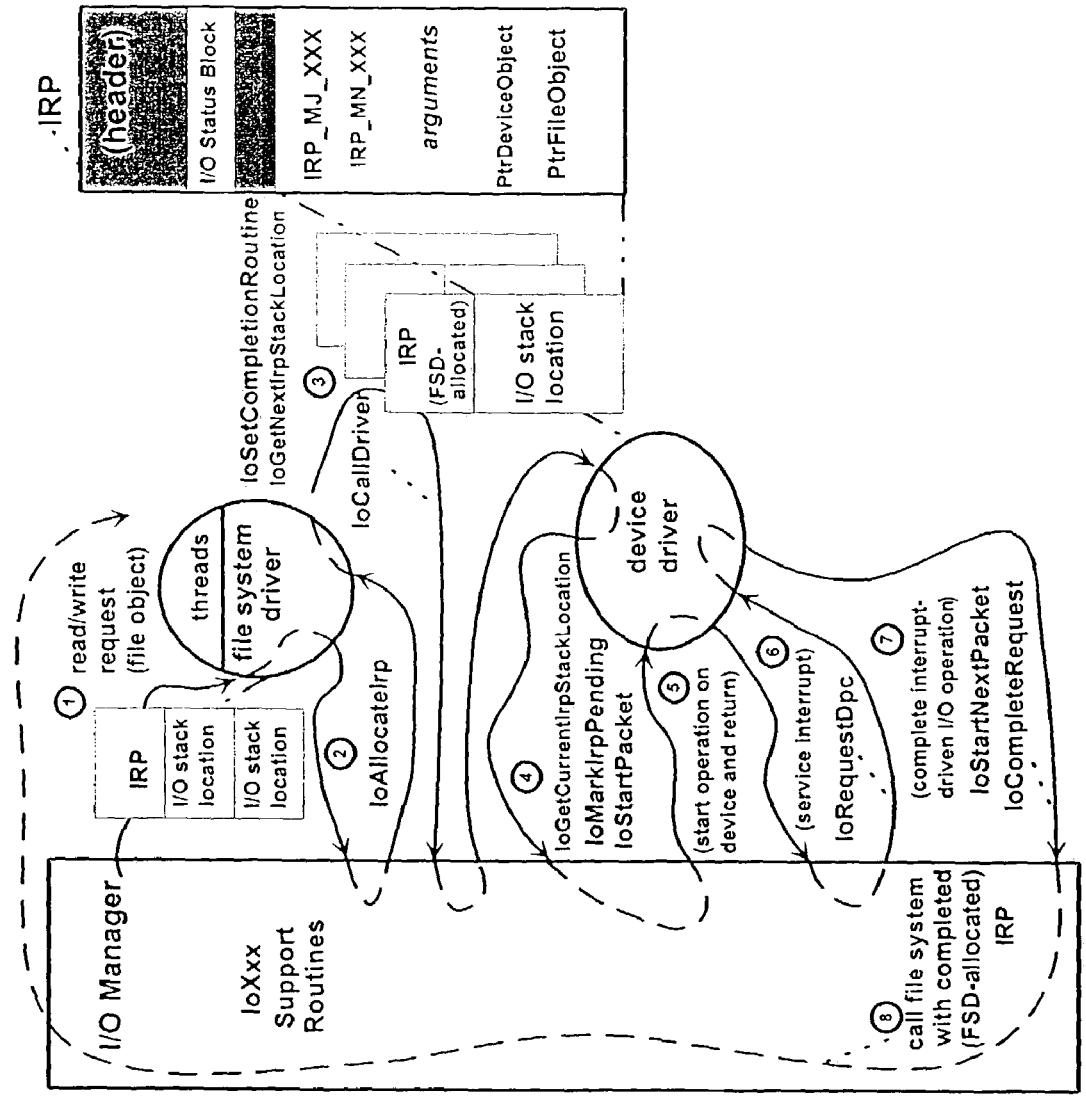
FIG. 2 is a simplified block diagram of an NT® operating system architecture during a process of IRP processing is shown.

Referring to FIG. 2, a simplified block diagram of an NT® operating system architecture during a process of IRP processing is shown. The IO Manager calls the file system driver (FSD) with the IRP it has allocated for the subsystem's read/write request. The FSD accesses its IO stack location in the IRP to determine what operation it should carry out.

The FSD sometimes breaks the originating request into smaller requests by calling an IO support routine one or more times to allocate IRPs, which are returned to the FSD with zero-filled IO stack location(s) for lower-level driver(s). At its discretion, the FSD can reuse the original IRP, rather than allocating additional IRPs as shown in FIG. 2, by setting up the next-lower driver's IO allocation in the original IRP and passing it on to lower drivers.

For each driver-allocated IRP, the FSD calls an IO support routine to register an FSD-supplied completion routine so the driver is able to determine whether a lower driver satisfied the request and free each driver allocated IRP when lower drivers have completed it. The IO Manager calls the FSD-supplied completion routine whether each driver-allocated IRP is completed successfully, with an error status, or cancelled. A higher-level NT driver is responsible for freeing any IRP it allocates and sets up on its own behalf for lower-level drivers. The IO Manager frees the IRPs that it allocates after all NT drivers have completed them. Next, the FSD calls an IO support routine to access the next lower-level driver's IO stack location in its FSD-allocated IRP in order to set up the request for the next-lower driver, which happens to be the lowest-level driver in FIG. 2. The FSD then calls an IO support routine to pass that IRP on to the next driver.

When it is called with the IRP, the physical device driver checks its IO stack location to determine what operation (indicated by the IRP MJ XXX function code) it should carry out on the target device, which is represented by the device object in its IO stack location and passed with the IRP to the driver. This driver can assume that the IO Manager has routed the IRP to an entry point that the driver defined for the IRP—MJ XXX operation (here IRP MJ READ or IRP MJ WRITE) and that the higher-level driver has checked the validity of other parameters for the request.

If there were no higher-level driver, such a device driver would check whether the input parameters for an IRP MJ XXX operation are valid. If they are, a device driver usually calls IO support routines to tell the IO Manager that a device operation is pending on the IRP and to either queue or pass the IRP on to another driver-supplied routine that accesses the target device in the form of a physical or logical device such as a disk or a partition on a disk.

The IO Manager determines whether the device driver is already busy processing another IRP for the target device, queues the IRP if it is, and returns. Otherwise, the IO Manager routes the IRP to a driver-supplied routine that starts the IO operation on its device.

When the device interrupts, the driver's interrupt service routine {ISR) does only as much work BS as is necessary to stop the device from interrupting and to save, necessary context about the operation. The ISR then calls an IO support routine with the IRP to queue a driver-supplied DPC routine to complete the requested operation at a lower hardware priority than the ISR.

When the driver's DPC gets control, it uses the context as passed in the ISRs call to IoRequestDpc to complete the IO operation. The DPC calls a support routine to dequeue the next IRP when present and to pass that IRP on to the driver-supplied routine that starts IO operations on the device. The DPC then sets status about the just completed operation in the IRPs IO status block and returns it to the IO Manager with IoCompleteRequest.

The IO Manager zeroes the lowest-level driver's IO stack location in the IRP and calls the file system's registered completion routine with the FSD-allocated IRP. This completion routine checks the IO status block to determine whether to retry the request or to update any internal state maintained about the original request and to free its driver-allocated IRP. The file system often collects status Information for all driver-allocated IRPs it sends to lower-level drivers in order to set IQ status and complete the original IRP. When it has completed the original IRP, the IO Manager returns NT status, the subsystem's native function, to the original requester of the IO operation.

FIG. 2 also shows two IO stack locations in the original IRP because it shows two NT drivers, a file system driver and a mass-storage device driver. The IO Manager gives each driver in a chain of layered NT drivers an IO stack location of its own in every IRP that it sets up. The driver-allocated IRPs do not necessarily have a stack location for the FSD that created them. Any higher-level driver that allocates IRPs for lower-level drivers also determines how many IO stack locations the new IRPs should have, according to the StackSize value of the next-lower driver's device object.

An NT file system driver accesses the file object through its IO stack location in IRPs. Other NT drivers usually ignore the file object.

The set of IRP major and minor function codes that a particular NT driver handles are sometimes device-type-specific. However, NT device and intermediate drivers usually handle the following set of basic requests:

IRP MJ CREATE—open the target device object, indicating that it is present and available for IO operations;

IRP MJ READ—transfer data from the device;

IRP MJ WRITE—transfer data to the device;

IRP MJ DEVICE CONTROL—set up or reset the device according to a system-defined, device-specific IO control code; and IRP MJ CLOSE–close the target device object.

In general, the IO Manager sends IRPs with at least two IO stack locations to device drivers of mass-storage devices because an NT file system is layered over NT drivers for mass-storage devices. The IO Manager sends IRPs with a single stack location to any physical device driver that has no driver layered above it.

Figure 3:
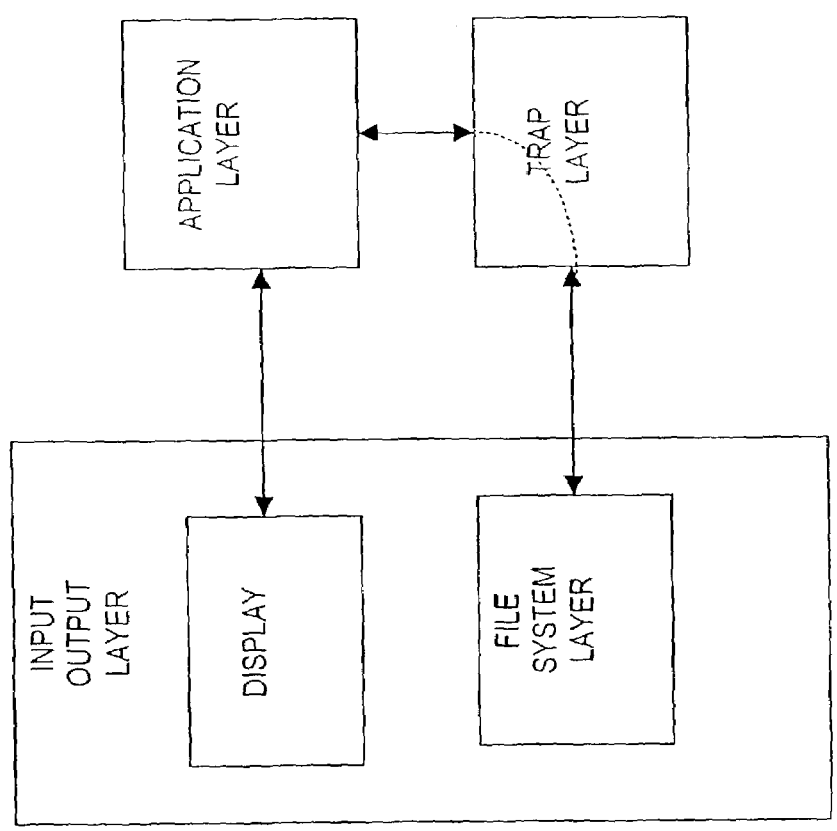
FIG. 3 is a simplified block diagram of an operating system according to the invention.

Referring to FIG. 3, a block diagram of an operating system is shown. The block diagram presents a simplified view of operating system functionality according to the invention. An application layer for supporting application execution communicates with an input/output layer of the computer. The input/output layer includes a display and a file system layer. The application layer communicates with the file system layer for, performing read operations and write operations with storage media. Disposed between the application layer and the file system layer is a trap layer also referred to as a filter layer. Each file system access request that is transmitted from the application layer to the file system layer is intercepted by the trap layer. In the trap layer restrictions relating to access privileges are implemented. For example, some requests are blocked and error messages are returned to the application layer. Other requests are modified and the modified request passed onto the file system. When a data store is read only, a request to open a file for read write access is modified to an open file for read-only access; a request to delete a file is blocked and an error message is returned. The use of a trap layer is applicable when the present invention is implemented within an existing operating system such as Windows NT®. Alternatively, an operating system supporting restricted write access is designed and restrictions relating to access privileges are implemented within the file system layer.

Figure 4:
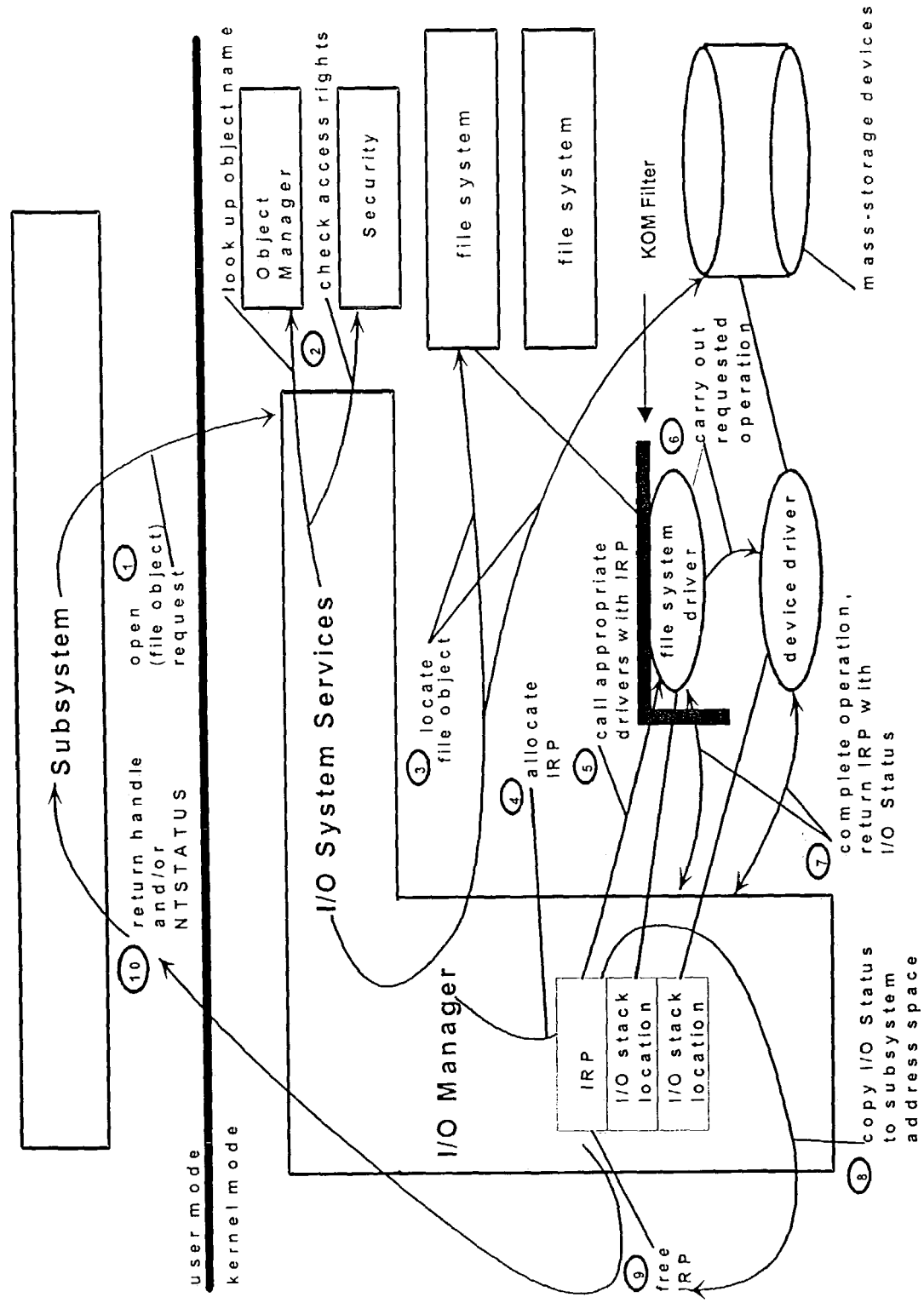
FIG. 4 is a simplified block diagram of a system for opening a file such as that shown in FIG. 1 modified according to the invention.

Referring to FIG. 4, a simplified block diagram of opening a file within Windows NT® according to the invention is shown. The diagram is based on the diagram of FIG. 1. The thick black line represents the trap layer or filter layer for preventing some file system operations from passing from the application layer to the file system layer. Accordingly, a data store device operates as a read/write device with a single device driver. The trap layer prevents write operations or, alternatively, other predetermined operations from being performed on a specific data store. The trap layer achieves this by blocking some requests and by modifying other requests. In this way, some operations are prevented without requiring modifications to existing applications Thus, one data store may be read only while another is read/write. Unlike prior art implementations, an application requesting a write operation to a data store that is read-only, receives an accurate and appropriate error message. There is no data lost by the device driver and, in fact, the device driver is freed of the trouble of dealing with file system commands which cannot be completed.

Also, the use of the trap layer allows for implementation of more complicated file access privileges based on data stored within each individual storage medium. For example, a storage medium may indicate read-write access but may not support delete operations. Device drivers perform low level commands such as read and write. Delete, is a write operation, the device driver performing write operations to obfuscate of overwrite a file. As is evident, the device driver supports delete operations as does any read/write data store. However, by indicating to the trap layer that delete operations are not supported, all delete requests passed from the application layer for the specific data stove are intercepted by the trap layer and an error message is returned to the application layer. No delete operation for a file is passed to the file system layer and therefore, the device driver does not perform the write operations for obfuscating or overwriting the file because none is received. It is evident that preventing file deletion is advantageous for protecting archived data and data histories.

Another operation which is advantageously restricted is overwriting of files. When a request is made to overwrite a file, typically the data within the file is overwritten. Overwriting of file data is a simple work around to perform a file delete when that operation is blocked. Alternatively in some devices, the data to overwrite is written to an unused portion of a storage medium and an address of the file data within a file allocation table is changed. The storage locations of the old file data are then considered free. Preventing data overwrite is performed according to the invention by modifying requests or blocking requests as necessary: Further, by trapping requests to overwrite file data according to the invention, a user friendly error message becomes possible. When an application,provides a request to overwrite a file, an error message indicating that overwrite is not permitted and that a file name is needed to save the data is provided. The trap layer, upon receiving the file name from the error message, modifies the request in accordance therewith and in accordance with permitted operations and passes the modified request to the file system layer. Accordingly, data integrity is preserved with minimal inconvenience to users of the system.

It is also useful to restrict access to file access permissions. Often, permissions are global across a storage medium and altering of the permissions is not desirable. Still, many operating systems provide for file and storage medium related access privileges. These are modifiable at any time. Since privileges are generally static, there are advantages to setting up privileges for a storage medium such that during normal operation and with normal file system operations, the privileges are static. Preferably, there is at least a way to modify the global privileges in case it is desirable to do so. Preventing alteration of privileges prevents individuals having access to files from modifying access privileges in any way.

Another operation that is usefully restricted is overwriting of zero length files. Some operations within some applications create a zero length file and then overwrite it. Thus preventing overwriting of zero length files directly affects those applications. An example of such an application and operation is the "save as" command in Microsoft Word®. Thus, preventing overwriting of zero length files effectively prevents "save as" from functioning on the associated medium.

Similarly, renaming a file is useful for obfuscating data. Preventing renaming of files prevents hiding existing files or making them more difficult to locate. For example, changing a client's information file name from "Client 101 Information" to "To Do Feb. 18" would make the file hard to locate. Thus, rename is an operation that it is desirable to restrict. Reasons for restricting the other listed operations are evident. Further, restricting other operations may also be advantageous and the present application is not limited to these operations.

Above mentioned operations which are advantageously restricted include overwriting files, changing file access permissions and medium access privileges, renaming files, formatting a medium and so forth. For example, a medium that does not allow any of the above mentioned operations provides a complete archival history of the medium's content and prevents alteration or deletion of the data. Such a medium is very useful for backing up office files or electronic mail.

Figure 5:
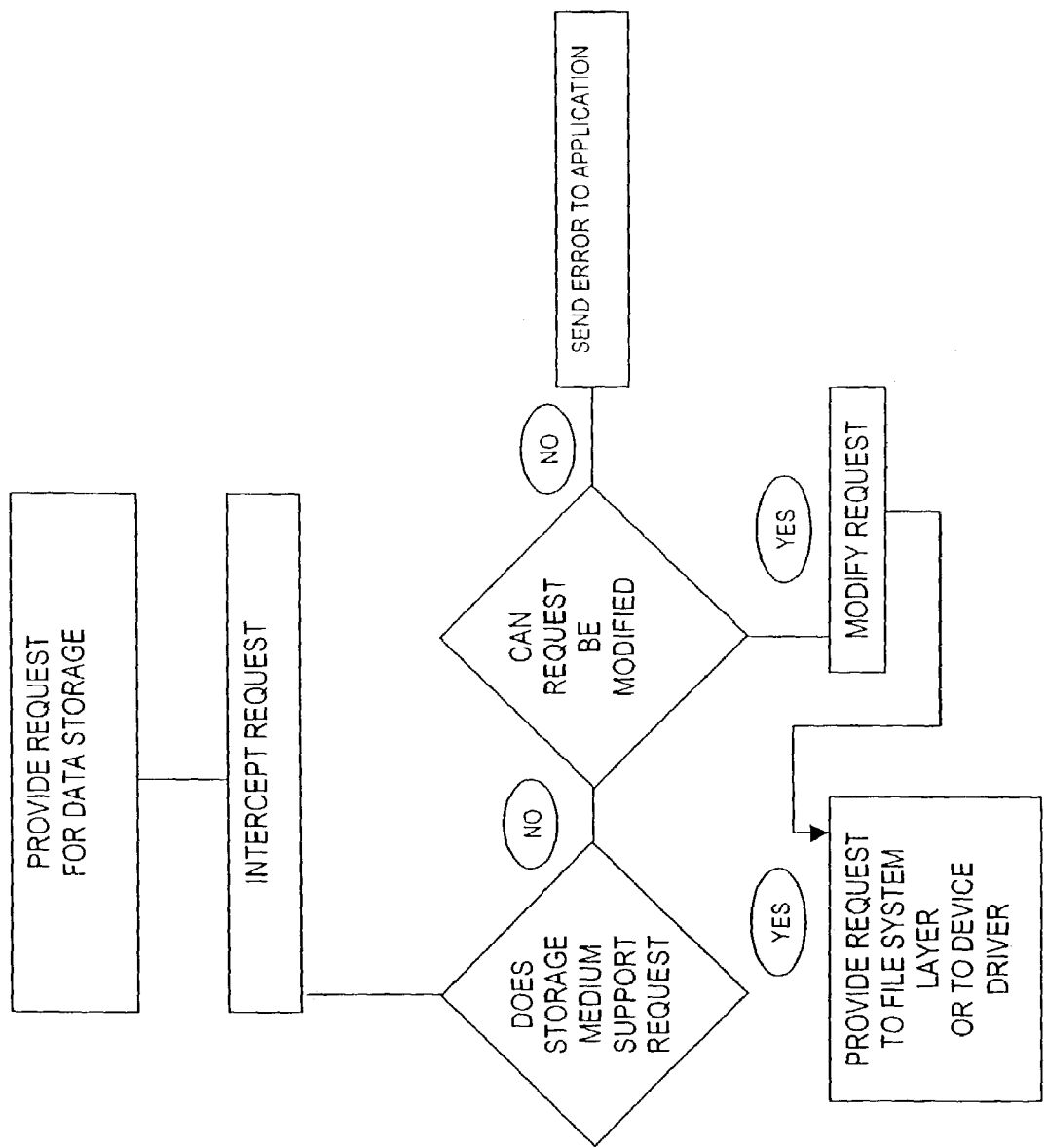
FIG. 5 is a simplified flow diagram of a method of storing data in a storage medium forming part of a system such as that of FIG. 1.

Referring to FIG. 5, a flow diagram of a method of storing data in a storage medium forming part of a system such as that of FIG. 3 is shown. An application in execution on the system seeks to store a data file on a storage medium within the file system layer of the system. A request and data for storage within the file is transmitted from the application layer to the file system layer. The request includes an operation and data relating to a destination storage medium on which to store the data. The trap layer intercepts the request and the data and determines whether the storage medium selected supports the operation. The trap layer is a transparent trap layer, which intercepts requests transparently to the user and transparently to a computer application invoking the requests. When the storage medium supports the operation, the request and the data is passed on to the file system layer. When necessary, the request is modified prior to provision to the file system layer. In the file system layer the operation is conducted according to normal file system layer procedures. When the storage medium does not support the operation in its original or a modified form, the trap layer returns an indication of this to the application layer. The operation and the data are not passed onto the file system layer. This provides additional access privilege functionality.

Figure 6:
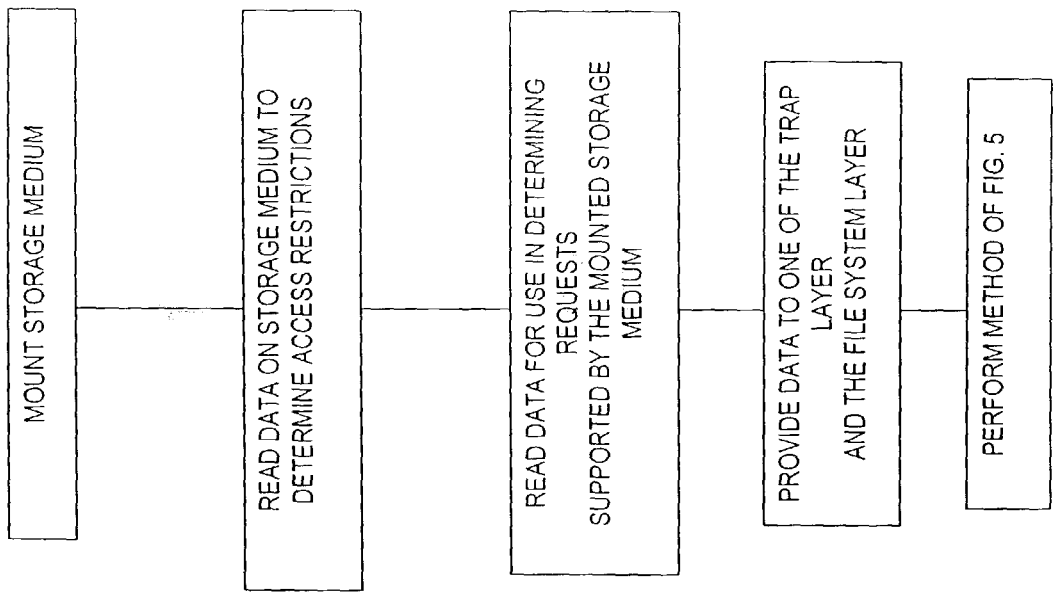
FIG. 6 is a simplified flow diagram of a method of providing software settable access privileges within Windows NT®; and, FIG. 7 is a simplified block diagram of the invention wherein the file system layer includes means for performing the functions of the trap layer.

Referring to FIG. 6, a simplified flow diagram of a method of providing software settable access privileges within Windows NT® is shown. A storage medium is mounted within a computer system. The storage medium has stored thereon data relating to access privileges for the storage medium. Upon mounting the storage medium, data relating to physical limitations of the read/write device are loaded into the device driver for that device within the file system layer. The limitations are recognised by the system software. Also upon mounting the storage medium, the data relating to access privileges for the storage medium are loaded into the trap layer. The trap layer limits operations performed on the storage medium to-those supported by the read/write device by limiting the requests passed onto the file system layer or, when the trap layer forms part of the file system layer, by filtering and/or modifying the requests. The data relating to access privileges for the storage medium are used to limit those requests provided to the file system layer.

When the storage medium is a data store for archiving purposes, there are evident advantages to treating the storage medium as a read-only storage medium. For example, once the-data store is full, setting it to read-only allows its use without risking tampering or accidental modification. Therefore, media specific access privileges are advantageous.

Figure 7:
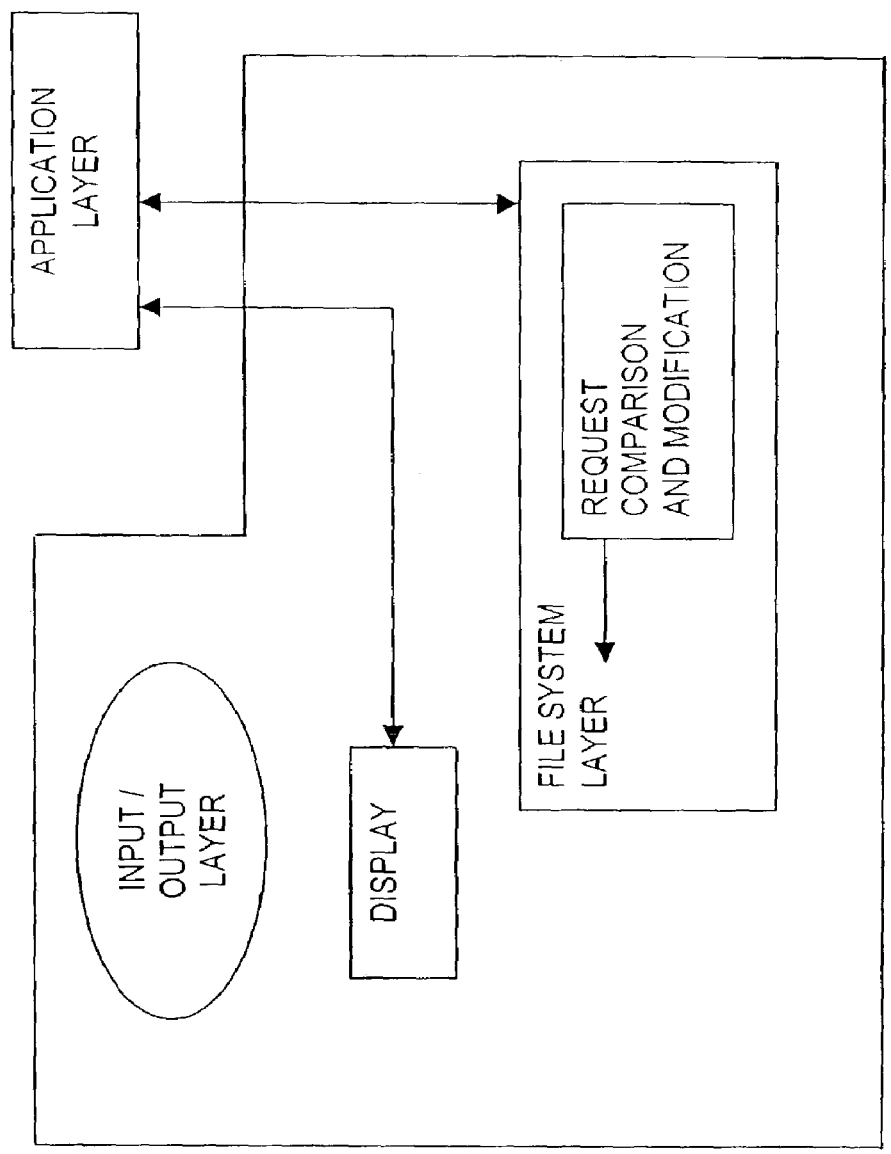

Referring to FIG. 7, a simplified block diagram of the invention wherein the file system layer includes means for performing the functions of the trap layer is shown. Such an embodiment, operates in a similar fashion to those described above. The file system receives all file access requests and compares them to those that are not permitted. When an access command is not permitted on an indicated storage medium, an error message is returned to the application layer. When an access command is permitted, it is performed on the appropriate storage medium. The access command may be that requested or, alternatively, a modified form of the requested command resulting in a supported operation.

The term logical storage medium is used herein and in the claim that follow to designate either a physical storage medium or a portion of physical storage medium that is treated by the operating system as a separate storage medium. Thus, a partitioned hard disk with two partitions consists of one physical storage medium and two logical storage media.

Numerous other embodiments of the invention may be envisaged without departing from the spirit and scope of the invention.

What is claimed is:

1. A method of applying an operation access privilege to at least a logical portion of a logical storage medium in communication with a computer, the method comprising the steps of:
    (a) providing an operation access privilege indicative of at least one of an enabled operation and/or a restricted operation to be performed on at least one logical portion of a logical storage medium;
    (b) associating said operation access privilege with at least one logical portion of said logical storage medium;
    (c) intercepting in a trap layer an attempted operation on said at least one logical portion identified by at least one data identifier, wherein said intercepting occurs regardless of an identity of a user attempting said attempted operation, and transparently to the user and transparently to a computer application invoking said operation; and
    (d) at least one of allowing said attempted operation if matching said enabled operation, modifying and allowing said modified attempted operation, and/or denying said attempted operation if matching said restricted operation.

2. The method as defined in claim 1, wherein said at least one logical portion of said logical storage medium comprises at least one of a volume, a partition, a directory, a special file, and/or a file.

3. The method as defined in claim 1, wherein said at least one logical portion of said logical storage medium comprises an entire logical storage medium.

4. The method as defined in claim 1, wherein said at least one data identifier comprises at least one of a file name, a file mask, a special file, and/or a directory.

5. The method as defined in claim 1, wherein said operations comprise at least one of reading, executing, appending, creating new objects, deleting, renaming, moving, overwriting, modifying attributes, and/or modifying data object security.

6. The method as defined in claim 1, further comprising:
    (e) applying a plurality of operation access privileges to said at least one data identifier.

7. The method as defined in claim 1, further comprising:
    (e) applying a plurality of operation access privileges to said logical portion of said logical storage medium.

8. The method as defined in claim 1, further comprising:
    (e) applying said operation access privilege to said logical storage medium wherein said logical storage medium is itself a logical portion of another logical storage medium, and wherein a logical portion of said another logical storage medium is specified by at least one data identifier.

9. The method as defined in claim 8, wherein said at least one data identifier comprises a free space portion.

10. The method as defined in claim 8, wherein said at least one data identifier comprises newly created data.

11. The method according to claim 1, wherein said operation access privilege comprises a file input/output (I/O) operation access privilege.

12. A system for applying an operation access privilege to at least a logical portion of a logical storage medium in communication with a computer, the system comprising:
  providing means for providing an operation access privilege indicative of at least one of an enabled operation and/or a restricted operation to be performed on at least a logical portion of a logical storage medium;
  associating means for associating said operation access privilege with at least one logical portion of said logical storage medium;
  interception means for intercepting in a trap layer an attempted operation on said at least one logical portion identified by at least one data identifier, wherein said interception means performs regardless of an identity of a user attempting said attempted operation, and transparently to the user and transparently to a computer application invoking said operation; and
  at least one of allowing means for allowing said attempted operation if matching said enabled operation, modifying and allowing means for modifying and allowing said modified attempted operation, and/or denial means for denying said attempted operation if matching said restricted operation.

13. The system as defined in claim 12, wherein said at least one logical portion of said logical storage medium comprises at least one of a volume, a partition, a directory, a special file, and/or a file.

14. The system as defined in claim 12, wherein said at least one logical portion of said logical storage medium comprises an entire logical storage medium.

15. The system as defined in claim 12, wherein said at least one data identifier comprises at least one of a file name, a file mask, a special file, and/or a directory.

16. The system as defined in claim 12, wherein said operations comprise means for at least one of reading, executing, appending, creating new objects, deleting, renaming, moving, overwriting, modifying attributes, and/or modifying data object security.

17. The system as defined in claim 12, further comprising:
  means for applying a plurality of operation access privileges to said at least one data identifier.

18. The system as defined in claim 12, further comprising:
  means for applying a plurality of operation access privileges to said portion of said logical storage medium.

19. The system as defined in claim 12, further comprising:
  means for applying said operation access privilege to said logical storage medium wherein said logical storage medium is itself a logical portion of another logical storage medium, and wherein a logical portion of said another logical storage medium is specified by at least one data identifier.

20. The system as defined in claim 12, wherein said at least one data identifier comprises a free space portion.

21. The system as defined in claim 12, wherein said at least one data identifier comprises newly created data.

22. A computer program product embodied on a computer readable media wherein the computer program product comprises logic which when executed performs the following method of applying an operation access privilege to at least a logical portion of a logical storage medium in communication with a computer, the method comprising the steps of:
  (a) providing an operation access privilege indicative of at least one of an enabled operation and/or a restricted operation to be performed on at least a logical portion of a logical storage medium;
  (b) associating said operation access privilege with at least one logical portion of said logical storage medium;
  (c) intercepting in a trap layer an attempted operation on said at least one logical portion identified by at least one data identifier, wherein said intercepting occurs regardless of an identity of a user attempting said attempted operation, and transparently to the user and transparently to a computer application invoking said operation; and
  (d) at least one of allowing said attempted operation if matching said enabled operation, modifying and allowing said modified attempted operation, and/or denying said attempted operation if matching said restricted operation.

23. The computer program product as defined in claim 22, wherein said at least one logical portion of said logical storage medium comprises at least one of a volume, a partition, a directory, a special file, and/or a file.

24. The computer program product as defined in claim 22, wherein said at least one logical portion of said logical storage medium comprises an entire logical storage medium.

25. The computer program product as defined in claim 22, wherein said at least one data identifier comprises at least one of a file name, a file mask, a special file, and/or a directory.

26. The computer program product as defined in claim 22, wherein said operations comprise at least one of reading, executing, appending, creating new objects, deleting, renaming, moving, overwriting, modifying attributes, and/or modifying data object security.

27. The computer program product as defined in claim 22, wherein the method further comprises:
  (e) applying a plurality of operation access privileges to said at least one data identifier.

28. The computer program product as defined in claim 22, wherein the method further comprises:
  (e) applying a plurality of operation access privileges to said portion of said logical storage medium.

29. The computer program product as defined in claim 22, wherein the method further comprises:
  (e) applying said operation access privilege to said logical storage medium wherein said logical storage medium is itself a logical portion of another logical storage medium, and wherein a logical portion of said another logical storage medium is specified by at least one data identifier.

30. The computer program product as defined in claim 22, wherein said at least one data identifier comprises a free space portion.

31. The computer program product as defined in claim 22, wherein said at least one data identifier comprises newly created data.

* * * * *

UNITED STATES PATENT AND TRADEMARK OFFICE
CERTIFICATE OF CORRECTION

PATENT NO.        : 7,076,624 B2                                          Page 1 of 1
APPLICATION NO.   : 10/600540
DATED             : July 11, 2006
INVENTOR(S)       : Shaath et al.

It is certified that error appears in the above-identified patent and that said Letters Patent is hereby corrected as shown below:

On the Title Page Item (30) should read,

--FOREIGN APPLICATION PRIORITY DATA:

07/31/1998   (CA) .......................................... 2,244,626--

Signed and Sealed this

Thirtieth Day of September, 2008

JON W. DUDAS
*Director of the United States Patent and Trademark Office*